(12) United States Patent
Amonou et al.

(10) Patent No.: US 8,315,315 B2
(45) Date of Patent: Nov. 20, 2012

(54) DEVICE AND METHOD FOR SCALABLY ENCODING AND DECODING AN IMAGE DATA STREAM, A SIGNAL, COMPUTER PROGRAM AND AN ADAPTATION MODULE FOR A CORRESPONDING IMAGE QUALITY

(75) Inventors: Isabelle Amonou, Thorigne Fouillard (FR); Nathalie Cammas, Sens de Bretagne (FR); Stephane Pateux, Saint Gregoire (FR)

(73) Assignee: France Telecom, Paris (FR)

( * ) Notice: Subject to any disclaimer, the term of this patent is extended or adjusted under 35 U.S.C. 154(b) by 1007 days.

(21) Appl. No.: 11/813,836

(22) PCT Filed: Dec. 20, 2005

(86) PCT No.: PCT/EP2005/056986
§ 371 (c)(1),
(2), (4) Date: Aug. 1, 2008

(87) PCT Pub. No.: WO2006/074855
PCT Pub. Date: Jul. 20, 2006

(65) Prior Publication Data
US 2009/0016434 A1     Jan. 15, 2009

(30) Foreign Application Priority Data
Jan. 12, 2005 (FR) ...................................... 05 00331

(51) Int. Cl.
*H04N 7/12* (2006.01)
(52) U.S. Cl. ................................................. 375/240.27
(58) Field of Classification Search .................. None
See application file for complete search history.

(56) References Cited

U.S. PATENT DOCUMENTS
6,233,017 B1 * 5/2001 Chaddha ................... 375/240.12
(Continued)

FOREIGN PATENT DOCUMENTS
WO     WO 00/05898     2/2002
(Continued)

OTHER PUBLICATIONS
Radha H. et al., "Scalable Internet Video Using MPEG-4", Sep. 1999.
(Continued)

*Primary Examiner* — Ayaz Sheikh
*Assistant Examiner* — Faiyazkhan Ghafoerkhan
(74) *Attorney, Agent, or Firm* — David D. Brush; Westman, Camplin & Kelly, P.A.

(57) ABSTRACT

A method is provided for encoding a sequence of images generating a data stream in the form of a structure of embedded data layers of n successive levels each of which corresponds to the predetermined resolution of said images. Said method comprises an encoding stage, which encodes at least one of said layers of an n+1 level by prediction on the basis of said level n layer and encodes each data layer of the level n in the form of a base sub-stream and, optionally, in the form of at least one enhancement sub-stream enabling to obtain at least one version of the enhanced quality of said images. The method also encodes, for at least one data layer of the n level, at least one single sub-stream enabling to reconstruct the version of said images at said level n resolution with a quality higher than said enhanced qualities, wherein said single sub-steam of the level n layer is not used during the prediction encoding of the layers of a level other than the level n.

12 Claims, 6 Drawing Sheets

U.S. PATENT DOCUMENTS

| | | | |
|---|---|---|---|
| 6,275,531 B1 * | 8/2001 | Li | 375/240.12 |
| 6,480,541 B1 * | 11/2002 | Girod et al. | 375/240.12 |
| 6,907,070 B2 * | 6/2005 | Wu et al. | 375/240.12 |
| 7,075,986 B2 * | 7/2006 | Girod et al. | 375/240.12 |
| 7,082,164 B2 * | 7/2006 | Chaddha | 375/240.12 |
| 7,130,473 B2 * | 10/2006 | Wu et al. | 382/238 |
| 7,269,289 B2 * | 9/2007 | Wu et al. | 382/238 |
| 7,616,824 B2 * | 11/2009 | Flierl et al. | 382/240 |
| 7,826,537 B2 * | 11/2010 | Zhang et al. | 375/240.27 |
| 2002/0037037 A1 * | 3/2002 | Van Der Schaar | 375/240.1 |
| 2002/0064227 A1 * | 5/2002 | Van Der Schaar et al. | 375/240.11 |
| 2002/0118742 A1 * | 8/2002 | Puri et al. | 375/240.1 |
| 2002/0150158 A1 * | 10/2002 | Wu et al. | 375/240.12 |
| 2003/0206558 A1 * | 11/2003 | Parkkinen et al. | 370/477 |
| 2003/0223642 A1 * | 12/2003 | Ye et al. | 382/233 |
| 2004/0005095 A1 * | 1/2004 | Wu et al. | 382/238 |
| 2004/0223653 A1 * | 11/2004 | Rose | 382/238 |
| 2005/0190834 A1 * | 9/2005 | Wu et al. | 375/240.1 |
| 2005/0195895 A1 * | 9/2005 | Wu et al. | 375/240.1 |
| 2005/0246751 A1 * | 11/2005 | Boyce et al. | 725/101 |
| 2005/0265616 A1 * | 12/2005 | Rose | 382/240 |
| 2006/0012719 A1 * | 1/2006 | Karczewicz et al. | 348/699 |

FOREIGN PATENT DOCUMENTS

| | | |
|---|---|---|
| WO | WO 02/25925 | 3/2002 |

OTHER PUBLICATIONS

Andreopoulos Y. et al., "Fully-scalable Wavelet Video Coding Using In-band Motion Compensated Temporal Filtering", Apr. 6, 2003.

Taubman D. "High Performance Scalable Image Compression with EBCOT", Jul. 2000.

International Preliminary Report on Patentability from counterpart foreign Application No. PCT/EP2005/056986.

International Search Report from counterpart foreign Application No. PCT/EP2005/056986.

* cited by examiner

DEVICE AND METHOD FOR SCALABLY ENCODING AND DECODING AN IMAGE DATA STREAM, A SIGNAL, COMPUTER PROGRAM AND AN ADAPTATION MODULE FOR A CORRESPONDING IMAGE QUALITY

CROSS-REFERENCE TO RELATED APPLICATION

This Application is a Section 371 National Stage Application of International Application No. PCT/EP2005/056986, filed Dec. 20, 2005 and published as WO 2006/074855 on Jul. 20, 2006, not in English.

FIELD OF THE DISCLOSURE

The field of the disclosure is that of the encoding and decoding of images or video sequences of images. More specifically, the disclosure relates to a technique for the scalable encoding and decoding of images, i.e. the encoding and decoding of images with adaptable quality and variable space/time resolution.

BACKGROUND

At present, many data transmission systems are heterogeneous in the sense that they serve a plurality of customers having many varied types of access to data. Thus, the worldwide Internet for example is accessible from a PC type terminal as well as from a radio-telephone. More generally, the bandwidth for access to the network, the processing capacities of the customer terminals and the size of their screens vary greatly from one user to another. Thus, a first customer may, for example, access the Internet from a powerful PC with an ADSL bit rate of 1024 kbits/s at his disposal while a second customer seeks to access the same data at the same time using a PDA personal digital assistant) type terminal connected to a modem with a low bit rate.

These different users therefore need to be offered a data stream adapted to their requirements that vary in terms of both bit rate and image resolution. This necessity is applicable more broadly to all applications accessible to customers having a wide variety of access and processing capacities, and especially to the following applications:

VOD ("Video On Demand"), accessible to UMTS ("Universal Mobile Telecommunication Service") type radio-communications terminals, PCs or television terminals with ADSL access.

session mobility (for example resumption on a PDA of a video session begun on a television set or, on an UMTS type mobile, of a session begun on GPRS ("General packet radio service");

session continuity (in the context of sharing of the bandwidth with a new application);

high-definition television, wherein a single video encoding must provide for service to customers having standard definition (SD) as well as those having high definition (HD);

video-conferencing wherein a single encoding must meet the needs of customers having UMTS access and Internet access;

etc.

To meet these different requirements, scalable image-encoding algorithms have been developed, enabling adaptable quality and variable space-time resolution. The encoder generates a compressed stream with a hierarchical structure of layers in which each of the layers is embedded in a higher-level layer. For example, a first data layer conveys a 256 kbits/s stream which may be decoded by a PDA type terminal, and a second complementary data layer conveys a stream with a resolution greater than 256 kbits/s which could be decoded, complementarily to the first stream, by a more powerful PC type terminal. The bit rate needed to transport these two embedded layers is, in this example, 512 kbits/s.

Certain of these scalable video-encoding algorithms are now being adopted by the MPEG ("Moving Picture Expert Group") standard in the context of the MPEG21 working group.

In particular, the model recently chosen by the MPEG-21 Working Group, the SVC ("Scalable Video Coding") model, is called the SVM ("Scalable Video Model") and is based on a scalable encoder based on AVC ("Advanced Video Coding") type solutions. This model is described in detail in the document N6716 ISO/IEC JTC 1/SC 29/WG 11, entitled "Scalable Video Model 3.0", Oct. 2004, Palma de Majorca, Spain. The MPEG 21 working group is aimed at proposing a standard for the supply of scalable streams that are average-grained in the space-time dimensions and in quality.

2.1 The MPEG-21 SVM Encoder
2.1.1 Main Characteristics of the Encoder

FIG. 1 illustrates the structure of such an encoder, having a pyramid structure. The video input components 10 undergo a dyadic sub-sampling operation (2D decimation by two referenced 11, 2D decimation by four referenced 12). Each of the sub-sampled streams then undergoes an MCTF (motion-compensated temporal filtering) type temporal decomposition 13. A low-resolution version of the video sequence is encoded 14 up to a given bit rate R_r0_max corresponding to the maximum decodable bit rate for the low spatial resolution r0 (this base level is AVC compatible).

The upper levels are then encoded 15, 16 by subtraction of the previous reconstructed and over-sampled level and by encoding the residues in the form of;

a base level;

possibly one or more enhancement levels obtained by multi-ran encoding of bit planes (hereinafter called FGS for "fine-grain scalability"). The prediction residue is encoded up to a bit rate R_ri_max which corresponds to the maximum bit rate decodable for the resolution ri.

More specifically, the MCTF filtering blocks 13 perform a temporal wavelet filtering, i.e. they realign the signals in the sense of the motion before wavelet filtering: they deliver information on motion 17 fed to a motion-encoding block 14-16 and textural information 18, fed to a prediction module 19. The predicted data output from the prediction module 19 serves for the performance of an interpolation 20 from the lower level. They are also fed to a space transformation and entropic encoding block 21 that works on refinement levels of the signal. A multiplexing module 22 orders the different sub-streams generated in a total compressed data stream.

FIG. 2 illustrates the results obtained by means of the scalable encoder of FIG. 1 in the form of bit-rate/distortion curves represented for different scalable resolutions (CIF/QCIF for "Common Interface Format/Quarter Common Interface Format", where the CIF corresponds to a TV semi-format, and the QCIF to a TV quarter format) or different temporal resolutions (7.5-30 hz, number of images per second). The y-axis shows the PSNR ("Peak Signal to Noise Ratio") and the x-axis shows the bit rate expressed in kbits/s. Thus, the curve referenced 23 corresponds to a QCIF spatial resolution with a temporal resolution of 7.5 Hz, the curve referenced 24 corresponds to a QCIF resolution at 15 Hz, the curve referenced 25 to a CIF resolution at 15 Hz, and the curve referenced 26 to a CIF resolution at 30 Hz.

2.1.2 Generation of Information Layers at the Encoder

FIG. 3 illustrates the mechanism of prediction/extraction of the information implemented by the SVM encoder. A more detailed description is given here below of the prediction implemented when encoding. This prediction consists in encoding a layer with a given level n spatial resolution by prediction from data from layers with lower-level spatial resolution.

More specifically, FIG. 3 presents an example of the generation of two successive layers of QCIF and CIF format spatial resolution layers, respectively associated with the bit rate/distortion curves referenced 30 (QCIF format) and 31 (CIF format). Those skilled in the art will have no difficulty in extending this example to the more general case of n>2 spatial layers. As above, the x-axis represents the bit rate expressed in kbits/second and the y-axis represents the PSNR in dB.

For each spatial resolution layer, the encoder encodes the information in the form of two sub-streams: a base sub-stream (sub-layer) called BL (for "base layer") and a gradual enhancement sub-stream or sub-layer called EL (for "enhancement layer").

The QCIF format is first of all encoded on all the ranges of values of temporal frequencies and bit rate. There is a base level (BL) 301 and two possible enhancement levels (EL) referenced FGS1 referenced 302 and FGS2 referenced 303 (FGS-for "fine grain scalable"). The enhancement layer EL therefore has the two runs FGS1 302 and FGS2 303. Intermediate refinement points may be obtained when decoding by cutting data packets between PGS1 and FPS2.

The QCIF format is encoded up to a maximum bit rate point 304 which is then used as a reference for prediction during the encoding of the CIF format. This point must be the best one that can be defined for generally optimum functioning of the system.

The CIF format is then encoded by using the highest point of the QCIF curve 304 (i.e. the maximum bit rate point of this curve) as the predictor The CIF information is also encoded in two sub-streams: a base sub-stream (BL) and an enhancement sub-stream (EL), constituted by two runs (FGS1 and FGS2).

FIG. 3 shows that, starting from the maximum QCIF bit rate point 304 and by adding the base layer (BL) 311 of the CIF spatial resolution level, the CIF reference point 312 is reached. This point is not the minimum bit rate point 313 that can be attained at decoding. Starting from this reference point 312, the enhancement layers EL 314 (FGS1) and 315 (FGS2) enable access to other higher CIF bit rate points, up to a maximum CIF bit rate 316.

FIG. 4 summarizes the order of processing of the information as is done at the encoder for any unspecified level n−1 and n spatial layers, where n is an integer. BL represents the base quality sub-layer and EL represents the enhancement quality sub-layer, of a spatial resolution level. Hence, first of all, the level n−1 base sub-layer BL is encoded 41, then the enhancement sub-layer EL of the n−1 level, the base sub-stream BL of the n level spatial resolution is encoded 43, and then the enhancement sub-stream EL. of this n level is encoded 44. The same procedure is performed subsequently for the higher levels of spatial resolution.

2.2 The MPEG-21 SVM Extractor

The extractor, also called a quality adaptation module here below, is the tool which performs the extraction, for the decoder, of the portion of the total data stream generated by the encoder, which corresponds to a given space-time resolution level and a given bit rate.

2.2.1 General Working of a Scalable Stream Extractor

There are two types of scalable encoders:
- the non-predictive "naturally scalable" encoders (based for example on a wavelet transformation) which do not specify particular relationships between the decoding points, embedded in one another (this is the case for example with the video encoders proposed by the JPEG2000 standard);
- the predictive SVM type encoders which need to build embedding paths. More specifically, to carry out a compressed stream extraction, the extractor of the SVM follows predefined paths, embedded in one another, as shown in FIG. 5.

In FIG. 5, the x-axis shows the temporal resolution expressed in Hz, the y-axis shows the bit rate (high H, low L) and the z axis shows the spatial resolution (QCIF or CIF). The total data stream 50 generated by the encoder consists of a set of sub-streams represented in the form of cubes, each corresponding to a given space-time resolution and a given bit rate. Thus, to extract the highest bit rate from the QCIF spatial resolution level at 7.5 Hz, the extractor must follow the following extraction path: CaS 30H→CIF 15H→QCIF 15H→QCIF 7.5H (it will be noted that CIF 30H designates for example the stream in the CIF spatial resolution format for a temporal frequency of 30 Hz, with a high bit rate level H).

Similarly, to extract the lowest bit rate of the QCIF at 7.5 Hz, the extractor must follow the path CIF30 H→CIF 15H→CIF 15 L→QCIF 15 L→QCIF 7.5 L.

2.2.2 Operation of the MPEG-21 SVM Extractor

The MPEG-21 SVM extractor works as follows. To decode a video stream at a given bit rate Rt and with a space-time resolution St-Tt, a sub-stream is extracted from the total stream as follows: the base quality layers of all the levels of spatial resolution (from the base level to the target spatial resolution level St) ($BL_{n-1}$, $BL_n$, ...) are extracted for a cost of Rmin, corresponding to the minimum decodable bit rate for the spatial resolution St. After extraction of the base quality sub-streams, the authorized bit rate becomes Rt=Rt-Rmin.

The extractor then goes through the temporal sub-bands of the lower spatial resolutions and extracts the different enhancement layers EL of each sub-band. It makes a loop on the temporal sub-bands of lower spatial resolution and then a loop on the enhancement layers of each temporal sub-band.

Let Rf be the bit rate necessary to extract a quality layer from a temporal sub-band. If the authorized bit rate Rt>Rf, the layer of the sub-band considered is extracted and the bit rate becomes Rt=Rt−Rf. If not, the layer of the sub-band considered is truncated and the extraction is terminated.

If all the layers of the temporal sub-bands of the lower spatial resolutions have been extracted, the extractor examines the sub-bands of the spatial resolution level St. The extractor makes a loop on the FGS quality layers and then on the temporal sub-bands. Rfs denotes the bit rate necessary to extract a quality q layer for all the temporal sub-bands. If the authorized bit rate Rt>Rfs, then the quality q layer of all the sub-bands is extracted and the bit rate becomes Rt=Rt−Rfs. If not, the quality q layer of all the sub-bands is truncated and the extraction is ended.

FIG. 6 shows the order of processing of the information by the extractor, or quality adaptation module. For extraction at a level n spatial resolution n, the extractor first of all goes through all the base quality BL levels of all the spatial levels (QCIF, CIF, etc.) from level 0 to level n, then the enhancement quality layers EL from the lower spatial levels (EL 0) up to n (EL n).

The extraction mechanism can also be illustrated by FIG. 3 described here above with reference to the prediction mechanism, using the bit rate/distortion curves 30 and 31. Here below, we consider the path followed by the extractor of the SVM MPEG-21 along these curves to generate different points of bit rates at decoding.

Thus, to generate a bit rate point in the QCIF format, the extractor first of all retrieves the base layer 301 from the QCIF level. From the QCIF minimum point 305, it is then possible to extract any bit rate point higher than the QCIF minimum point 305 and lower than the maximum bit rate point 304 (which is the one used for the prediction of the spatial resolution layer higher than the CIF format). To do this, the enhancement layer or sub-stream (EL), constituted by the runs FGS1 302 and FGS2 303 is cut according to the allocated bit rate.

To generate a bit rate point in the CIF format, two approaches are possible depending on whether the required bit rate is greater than the bit rate of the reference point 312 or below this reference point.

If the target bit rate is below the bit rate of the CF reference point 312, the extractor retrieves the base layers BL 301 and 311 of the two QCIF and CIF spatial levels, thus leading to the minimum CIF bit rate point 313. Depending on the remaining bit rate, the extractor truncates the enhancement layers EL 302 and 303 of the QCIF spatial resolution level.

If the requested bit rate is higher than the bit rate of the CIF reference point 312, the extractor retrieves the base layers BL 301 and 311 of the CIF and QCIF levels, the enhancement layer EL 302, 303 of the QCIF level and cuts the CIF enhancement layer 314, 315 according to the remaining bit rate.

3. Drawbacks of the Prior Art

The encoding/decoding techniques of the SVM model of the MPEG-21 working group have various drawbacks. The extraction mechanism associated with this technique has many flaws.

First of all, it can be seen that with the order of processing of information in the extractor (i.e. all the base layers BL of spatial levels, then the enhancement layers EL going from the spatial base level to the requested spatial levels), the extraction always follows the same path whatever the bit rate point requested when decoding. Now this path is not always the optimum path for each target bit rate point when decoding.

Furthermore, for each given level of spatial resolution from which a prediction has been made for the encoding of a higher level of spatial resolution, there is a maximum bit rate point which corresponds to the bit rate point used for the prediction. Now, this maximum bit rate point is not always the highest point that it is sought to attain for this level of spatial resolution. Indeed, the prediction point is chosen to minimize the residue of prediction during the encoding of the higher spatial level but does not correspond to a point of very high quality for the current spatial level. It is often desirable or necessary, especially for the low spatial resolutions, to have points available offering an image reconstruction quality higher then the one given by the prediction point.

Finally, one last drawback of the MPEG-21 SVM encoding technique is that, for extraction, at a level n of spatial resolution (in the CIF format for example), of points with bit rate lower than the bit rate of the reference point of this level (the point referenced 312 for example in FIG. 3, i.e. the point obtained by decoding of the base layers BL of the spatial levels 0 to n and of all the refinement layers EL of the levels 0 to n−1), no piece of refinement information of the level n (i.e. no piece of information from the enhancement levels EL 314 and 315 of the CIF level of example) is used.

SUMMARY

A method is provided for the encoding of an image or a sequence of images generating a data stream having a hierarchical structure of embedded data layers of successive levels n, where n is an integer, each of said levels n corresponding to a predetermined resolution of said images. Such a method comprises a step for the encoding of at least one of said layers, of level n+1, by prediction at least from said level n layer. Each of said level n data layers enables the reconstruction of a version of said images at said resolution level n of a predetermined maximum quality.

According to an example, such a method also encodes, for at least one of said level n data layers, at least one additional sub-stream, called a singular sub-stream or "dead substream" enabling the reconstruction of a version of said images at said resolution level n of a quality higher than that of said predetermined maximum quality, and said dead substream of said layer level n is not used during said step of encoding by prediction of said layers of a level different from n.

Thus, an example relies on an entirely novel and inventive approach to the encoding of scalable image streams or video streams. Indeed, whereas in the prior art (as described especially by the SVM model of the MPEG-21 working group), the totality of the data of a layer of a level having a resolution n−1 was used for the encoding by prediction of the higher level n layer, the example henceforth proposes the encoding of additional information associated with the resolution level n−1, which will be used neither for the encoding by prediction of the level n nor for the reconstruction of images at the resolution level n. This additional information, encoded in a dead sub-stream, would be used at decoding only for the reconstruction of images at the resolution level n−1.

In other words, by reasoning on the basis of bit rate-distortion curves associated with each of the embedded data layers of the encoded stream, the disclosure proposes to dissociate the maximum bit rate point P_max of the bit rate-distortion curves of a layer of a given resolution level n−1 from the point of this curve, called a prediction point P_pred, used to predict the data layer of resolution level n. The dead sub-stream of the level n layer therefore makes it possible to cover all the bit rates situated between the bit rate of the prediction point P_pred and the bit rate of the maximum point P_max.

Through this dead sub-stream, it is possible at decoding to achieve a reconstruction of the image or video sequence at the resolution level n of a quality higher than that of the prior art, which is particularly worthwhile for certain display terminals for which the quality achieved by reconstruction at the level n from the point P_pred is not sufficient.

Advantageously, each level n data layer is encoded in the form of at least one base sub-stream BL, enabling the reconstruction of a base quality version of the images with the level n resolution and, as the case may be, of at least one enhancement sub-stream EL, enabling the base quality version to be refined, to obtain at least one enhanced quality version of the images. Said predetermined maximum quality is:
  the base quality if said enhancement sub-stream is not encoded;
  said at least one enhanced quality if at least one enhancement sub-stream is encoded.

Indeed certain data layers may be encoded only in the form of a base sub-stream and others may also include one or more enhancement sub-streams. The dead sub-stream encoded according to an example enables the reconstruction of the images of a quality higher than the maximum quality obtained from the base sub-stream alone or from the base sub-stream and the enhancement sub-stream or sub-streams if they exist.

According to one advantageous characteristic of the disclosure, a method of this kind also comprises a first step of insertion in said data stream of at least one piece of information used to identify said at least one dead sub-stream within said data stream. It is indeed necessary when decoding to be able to distinguish the maximum bit rate point associated with a spatial resolution level n from the prediction point used for the encoding of the higher spatial resolution level n+1.

According to an exemplary characteristic of the disclosure, an encoding method of this kind also implements, for at least certain of said images, a second step of insertion in said data stream of at least one piece of information on the reconstruction quality associated with at least certain pieces of data of at least certain of said layers, said reconstruction quality being a function of at least one bit rate/distortion parameter.

The insertion of this piece of information on quality into the stream enables a selective adaptation of the quality in the different layers of level n resolution. Thus, for each point of the target bit rate at decoding, an optimum extraction path is defined, this path being the one enabling the best reconstruction of this image at this bit rate in the sense of the bit rate-distortion.

The disclosure also relates to a device for the encoding of an image or a sequence of images comprising means for generating a data stream having a hierarchical structure of embedded data layers of successive levels n, where n is an integer, each of said levels n corresponding to a predetermined resolution of said images. Such a device comprises means for encoding at least one of said layers, of level n+1, by prediction at least from said level n layer, and each of said level n data layers enables the reconstruction of a version of said images at said resolution level n of a predetermined maximum quality.

According to the disclosure such a device also comprises means of encoding, for at least one of said level n data layers, of at least one sub-stream, called a dead sub-stream enabling the reconstruction of a version of said images at said resolution level n of a quality higher than that of said predetermined maximum quality, and said dead sub-stream of said level n layer is not used by said encoding means by prediction of said layers of a level different from n. This dead sub-stream therefore gets added, for the level n layer, to the base sub-stream BL and, as the case may be, to the enhancement sub-streams EL that it comprises.

Advantageously, an encoding device of this kind comprises a prediction point extraction module used for the extraction, from within said level n layer, of the data to be taken into account during the encoding by prediction of said level n+1 layer. This prediction point extraction module is used to determine the point, distinct from the maximum bit rate point, to be used in order to perform the encoding of the higher-level layer.

The disclosure also relates to a method, and to an associated device, for the decoding of a data stream encoded according to the encoding technique described here above, which implements the following steps for the reconstruction of one of said images with said level n resolution:

decoding of said data layers of a level lower than n;
depending on an authorized decoding bit rate, at least a partial decoding of said level n layer and, as the case may be, of said dead sub-stream of said level n layer, dead sub-streams of said layers of a level lower than n being not decoded during said reconstruction.

More specifically, first of all it is the base sub-streams of a level lower than or equal to n that are decoded and then the enhancement sub-streams of the lower-than-n level layers when they exist. Finally, depending on the authorized decoding bit rate, decoding is carried out at least partially on the enhancement sub-stream or sub-streams of the level n layer and, as the case may be, on the dead sub-stream of this layer.

The disclosure also relates to a signal for the transmission of a data stream encoded according to the technique described here above. Such signal is structured in the form of information entities within which said data stream is conveyed, each of said information entities comprising a header providing information on a type of said information entity, and a payload data field.

According to an example, for at least one of said level n data layers, such a signal also conveys at least one sub-stream called a dead sub-stream enabling the reconstruction of a version of said images with said level n resolution of a quality higher than said predetermined maximum quality, said level n dead sub-stream being not used for the reconstruction of said images with a resolution of a level different from n.

In a first alternative embodiment, such a signal conveys said dead sub-stream within at least one information entity of a first specific type (for example the type 22 or 23 of the NALs, stipulated by the syntax of the SVM model) distinct from the type of said information entities conveying said base sub-streams and said enhancement sub-streams.

In a second alternative embodiment, at least one of said dead sub-streams and at least one of said enhancement sub-streams are conveyed within an information entity (NAL) of a same type and said signal conveys a least one piece of cutting information enabling the identification, within said NAL, of said singular sub-stream and said enhancement sub-stream.

When the above-described variant relating to an adapted selection of quality, enabling the definition of optimum extraction paths, is implemented during encoding, the signal must also convey the information on reconstruction of quality associated, in this variant, with certain pieces of data. To do this, two approaches have been envisaged.

A first alternative embodiment consists in modifying the structure of the existing information entities, namely the NALs, so that some of them also include pseudo-header comprising at least one pointer to at least certain data of said payload data field, said pointer providing information on a level of reconstruction quality associated with said data and depending on at least one bit rate/distortion parameter.

A second variant, which is preferable since it dictates no modification of the structure of the existing information entities, consists of the introduction, into the signal, of at least one information entity of a specific type comprising at least one piece of information on reconstruction quality associated with at least certain data of said streams, said reconstruction quality depending on at least one bit rate/distortion parameter.

Thus, specific NALs, called information NALs, are introduced, these information NALs containing in their payload data field offsets enabling the identification of quality levels in a data transportation NAL (namely a NAL conveying an enhancement sub-stream for example).

These information NALs can also transport a piece of information for identifying a dead sub-stream when they contain a piece of additional information indicating the quality level that corresponds to the beginning of a dead sub-stream.

The disclosure also relates to computer programs comprising program code instructions for the execution of the steps of the method for encoding an image or a sequence of images and for the execution of the steps of the method for decoding a data stream representing an image or a sequence of images described here above when said program is executed in or by a microprocessor.

The disclosure also relates to a module for adapting the quality of an image or a sequence of images, fed with a stream of source data representing an image or a sequence of images as described here above.

An adaptation module of this kind implements means for generating a modified data stream designed for at least one display terminal for viewing said images, said modified data stream being obtained from said source data stream by extraction, from said level n dead sub-stream if said at least one display terminal does not reconstruct said images with said level n resolution.

Such an adaptation module, also called an extractor, is used to extract, from the streams, those sub-streams that will not be used in reconstruction because of the nature of the terminals served for example. It may be located directly at output of the encoder, just before the decoder (or may even be integrated into the decoder) or again it may be situated at any point of the network of transmission by which the customer terminals access the stream.

Finally, the disclosure relates to a data carrier designed to store the above-mentioned data stream, having a structure for the hierarchical storage of embedded layers of data of this sub-stream. A data carrier of this kind also comprises, for at least one of said layers n level data layers, at least one zone for the storage of at least one dead sub-stream, which is not read at the reconstruction of said images with a resolution level different from n.

BRIEF DESCRIPTION OF THE DRAWINGS

Other features and advantages of the disclosure shall appear more clearly from the following description of an exemplary embodiment, given by way of a simple illustrative example, and from the appended drawings, of which:

FIG. 1 is a block diagram of the MPEG-21 SVC described in the above-mentioned document N6716;

FIG. 2 illustrates the different bit rate-distortion curves obtained from the encoder of FIG. 1;

FIG. 3 describes the prediction/extraction mechanism proposed by the SVM model of the MPEG-21, on the basis of the bit rate/distortion curves of the same type as those of FIG. 2;

FIG. 4 illustrates the order of processing of the data layers by the encoder of FIG. 1;

FIG. 5 is a drawing showing the principle of embedded extraction paths stipulated by the MPEG standard;

FIG. 6 describes the order of processing of the data layers at extraction preceding the decoding;

FIG. 12 illustrates the modification of the prediction/extraction mechanism of FIG. 3 in this variant;

FIG. 13 presents the principle of establishment of the truncation points in the sub-streams associated with the images;

FIGS. 14 and 15 describe two examples of the structure of information entities, or NALs, conveying the quality information inserted in the stream according to this variant;

FIG. 16 shows an example of a structure of images in successive quality levels;

DETAILED DESCRIPTION OF ILLUSTRATIVE EMBODIMENTS

The general principle of an embodiment of the invention relies on the encoding of an additional sub-stream in certain or all the resolution levels of the stream designed to enable the reconstruction of an image of better quality at this resolution level. This additional sub-stream, called a dead sub-stream, is used only at the resolution level for which it is encoded. In other words, at encoding, it is not used for the prediction of the layers of the other resolution levels and, at decoding, it is not used for the reconstruction of the images at other resolution levels.

In considering the bit rate-distortion curves associated with each of the resolution levels encoded in the stream, the insertion of a dead sub-stream such as this amounts to dissociating the maximum bit rate point of a resolution level from the point of this level used for the prediction of the higher resolution level.

Figure 7:
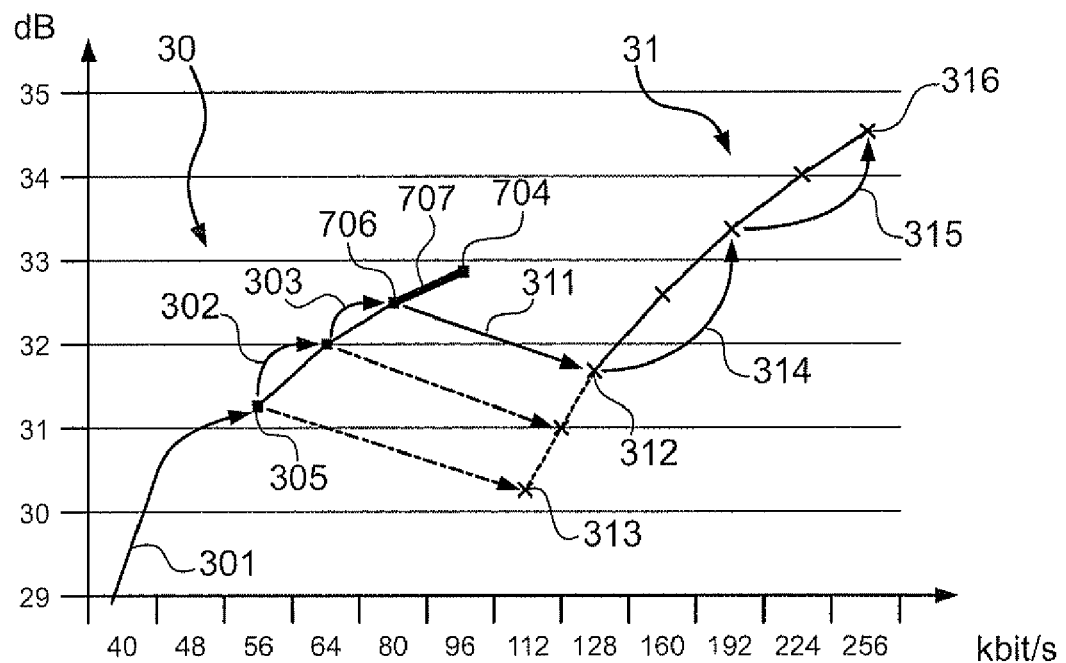
FIG. 7 presents the principle of insertion of a dead sub-stream at the resolution level n, in the form of bit rate-distortion curves.

Referring to FIG. 7, an embodiment is presented of the encoding technique of the invention, based on the addition of a dead sub-stream to a layer of spatial and/or temporal resolution data of a given level n.

Figure 3:
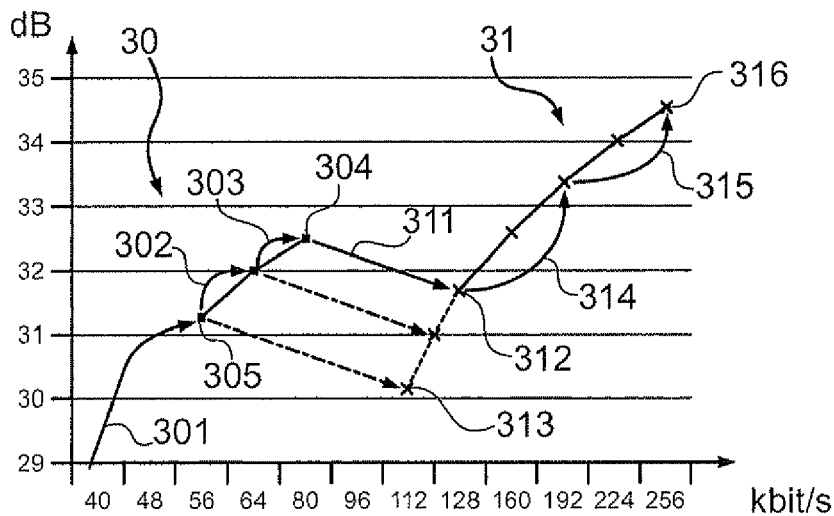
Figure 5:
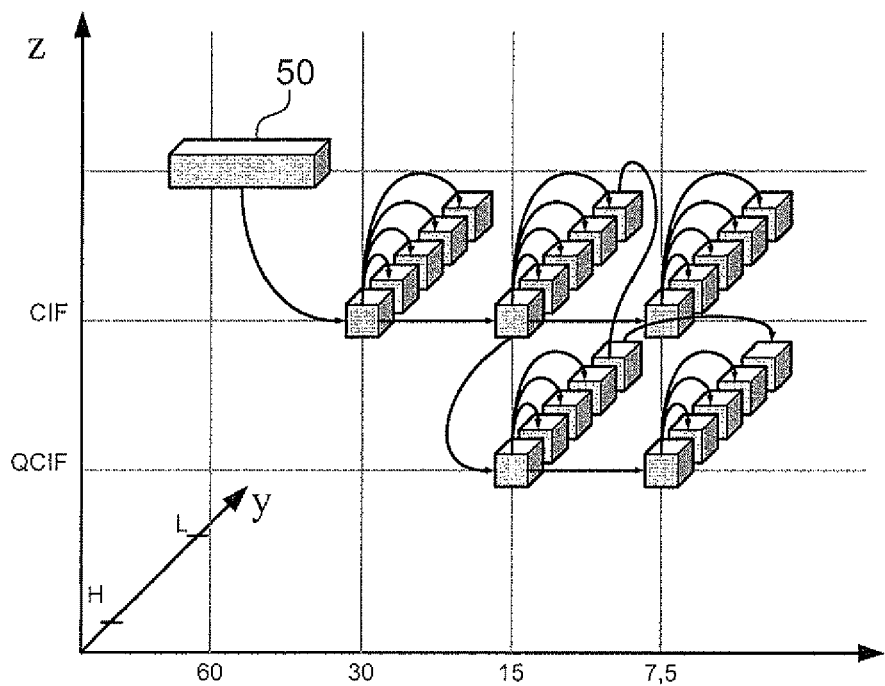
Figure 6:
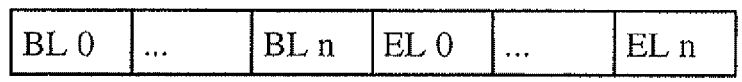

As above (see FIG. 3), the description pertains to the particular case of the encoding of the images with two embedded resolution formats, namely the QCIF and CIF formats. Those skilled in the art will have no difficulty in extending this teaching to the more general case of n successive resolution levels (for example QCIF, CIF, SD, HD, etc.). FIG. 7 shows the bit rate-distortion curves for these two formats (curve referenced 30 for the QCIF and curve referenced 31 for the CIF) with the x-axis showing the bit rate expressed in kbits/s and the y-axis showing the distortion expressed in the form of PSNR in dB. It will be noted that the same elements are designated by the same numerical references in FIGS. 3 and 7.

The principle of an embodiment of the invention therefore consists of the definition, at encoding, of a maximum bit rate point for a spatial level n−1 (in this case the point P_max referenced 704 for the bit rate/distortion curve of the QCIF format) different from the point used for the prediction of the spatial level n (i.e. the point P_pred 706 used for the prediction of the CIF format).

To do this, the following encoding steps are performed:
encoding of a data layer of spatial level n−1 (QCIF) up to a maximum bit rate point P_max 704;
extraction of a bit rate point P_red 706 of the level n−1 (QCIF);

introduction into the total encoded stream of an additional sub-stream called a dead sub-stream 707 for the spatial level n−1 (QCIF) covering the bit rates from P_pred 706 to P_max 704. This stream serves only for the reconstruction of the video sequence at some bit rate print at the resolution level n−1 (QCIF) and is not used for the reconstruction of higher or lower spatial level points;

introduction into the total stream of a piece of information of identification of a dead sub-stream making it possible, during the decoding or extraction of data from the stream, to identify the position of the prediction point P_pred 706 on the QCIF bit rate/distortion curve relative to the maximum bit rate point P_max 704;

encoding of the data layer of the spatial level n (CIF) in using a prediction of the spatial level n−1 (QCIF) at the bit rate point P_pred 706.

This encoding technique therefore leads to the appearance of new points on the bit rate/distortion curve 30 associated with the spatial resolution QCIF which belongs to a dead sub-stream 707 used exclusively for the reconstruction of images in the QCIF format.

When a terminal wishes to decode the total data stream thus encoded, the pieces of data necessary for the reconstruction of the video sequence are extracted from this stream, depending on the space-time resolution and the bit rate desired by the terminal. For reconstruction at a resolution level n, a bit rate point of this spatial level n is extracted in taking care not to use any of the dead sub-streams of the spatial levels different from n (especially the lower spatial levels), but in using, if necessary, the dead sub-stream of the spatial level n if the desired bit rate makes this use possible.

Figure 17:
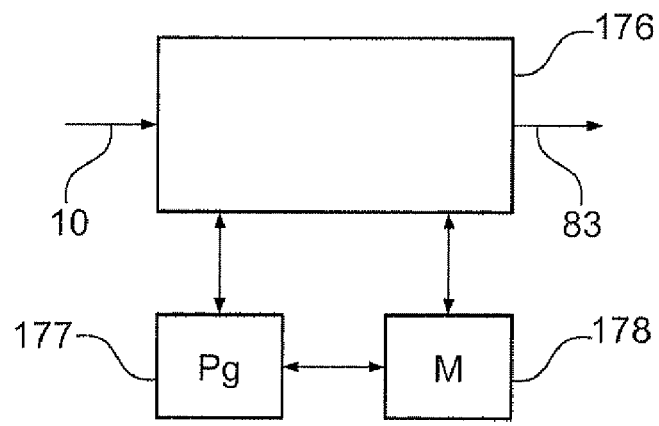
FIGS. 17 to 19 respectively present simplified diagrams of encoding devices, an image quality adaptation module and a decoding device according to an embodiment of the invention.

FIG. 17 shows the simplified structure of an encoding device of an embodiment of the invention, comprising a memory M 178, a processing unit 176, equipped for example with a microprocessor and driven by the computer program Pg 177. At initialization, the computer program 177 code instructions are for exampled loaded into a RAM before being executed by the processor of the processing unit. The processing unit 176 receives at input a video content 10 to be encoded. The microprocessor UP of the processing unit 176 encodes the video sequence 10 in the form of a compressed stream 83 comprising a plurality of embedded layers of n successive spatial resolution levels Pg 177. The processing unit 176 outputs a compressed data stream 83.

Figure 1:
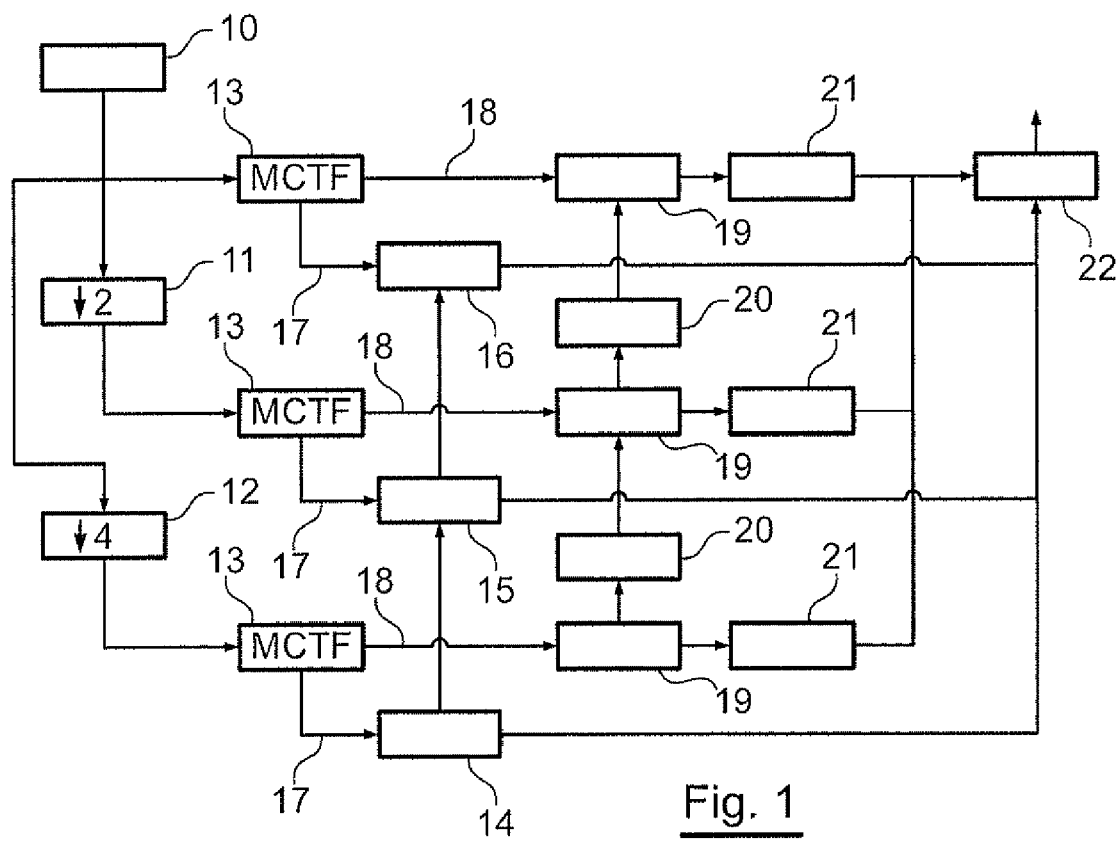
FIGS. 1 to 6, already described with reference to the prior art, relate to the SVM model of the MPEG-21 working group. More specifically.
Figure 2:
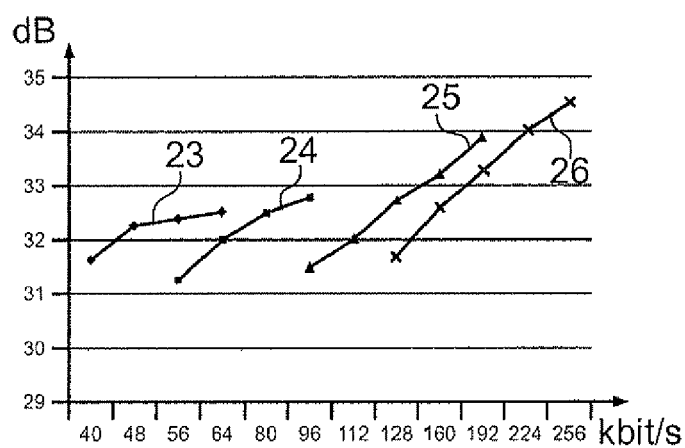
Figure 4:
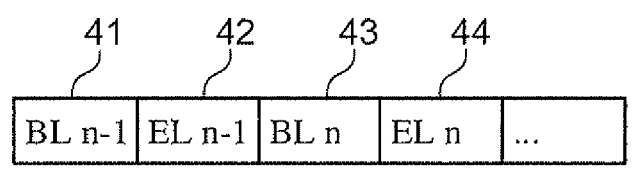
Figure 8:
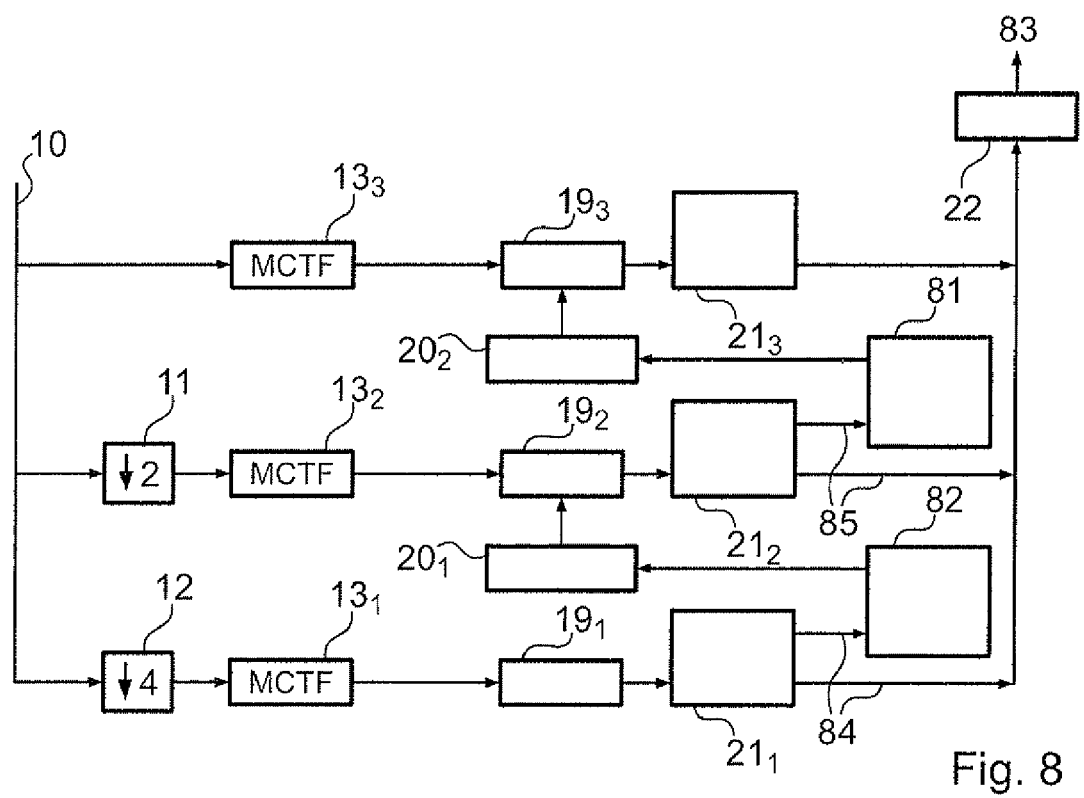
FIG. 8 is a block diagram of the encoder of an exemplary embodiment of the invention.

FIG. 8 more specifically represents the structure of an encoder enabling the introduction of dead sub-streams at certain or all the spatial resolution levels. It will be noted that the structure of such a coder differs from that of the MPEG-21 SVC encoder presented here above with reference to FIG. 1 only by the presence of prediction point extraction modules 81 and 82. The identical elements are therefore designated by the same numerical references in FIGS. 1 and 8. The example of FIG. 8 is situated in a context of scalable video encoding based on a temporal wavelet transformation with motion compensation and representation by layers with inter-layer representation.

The encoder of FIG. 8 works as follows:

(i) the video data 10 received at input of the encoder are fed into three arms of the encoder working in parallel, one arm in which the pieces of data undergo a decimation by four referenced 12, one arm in which the pieces of data undergo a decimation by two referenced 11, and the last arm in which the pieces of data are not sub-sampled and do not undergo any decimation;

(ii) the video sequence is first of all encoded in the basic spatial format (QCIF) by means of a motion-compensated temporal transform (MCTF) $13_1$, used to generate textural information in the form of wavelet coefficients (it will be noted that, for the sake of simplification, the modules for processing the motion information of the video sequence are not shown here). The transformed coefficients are encoded by prediction $19_1$ relative to other coefficients of the same spatial level and to a scalable entropic encoding $21_1$. A scalable sub-stream is obtained representing the basic spatial resolution level (sub-bistream0 referenced 84), with a total bit rate R_r0_max where r0 represents the spatial level and max indicates the highest bit rate point of the associated bit rate-distortion curve.

The bit rate point P_pred used for prediction for the higher spatial encoding level is extracted from the encoded scalable sub-stream by the prediction point extraction module referenced 82. The bit rate of the point P_pred is lower than the bit rate R_r0_max.

The extracted sub-stream is decoded and interpolated $20_1$ to be used for prediction 192 for the higher spatial resolution level. The scalable sub-stream 84 is sent to the multiplexer 22 which takes responsibility for organizing all the sub-streams of all the spatial resolution levels in order to form the final stream 83.

(iii) The video is then encoded at a higher spatial resolution (CIF) by means of a motion-compensated temporal transform (MCTF) $13_2$; the transformed coefficients are predicted 192 by means of the wavelet coefficients of the same spatial level (CIF) or of coefficients of the interpolated signal $20_1$ coming from the lower spatial level. The prediction 192 is followed by a scalable entropic encoding $21_2$, and a scalable sub-stream 85 representing the spatial resolution level r1 is obtained with a maximum bit rate R_r1_max. This sub-stream 85 is sent to the multiplexer 22. The bit rate point used for the prediction of the higher spatial level is then extracted from the encoded sub-stream 85 by the prediction point extraction module 81 and interpolated $20_2$.

The same procedure is performed for the higher spatial levels, except that no prediction point is extracted for the last spatial level.

Figure 9:
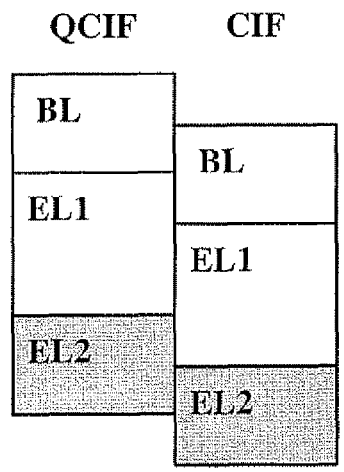
FIG. 9 describes the organization of the data performed by the encoder of FIG. 8 with insertion of a dead sub-stream.

FIG. 9 illustrates the data generated by the encoder of FIG. 8, in the particular example where only two distinct spatial resolution levels are considered, namely QCIF and CIF (in other words, the only elements considered are the sub-streams coming from the two lower arms of the encoder of FIG. 8, proceeding respectively from decimations by two and by four of the input video data 10).

In each data layer of a spatial resolution level (QCIF and CF), the pieces of data are organized in several sub-layers: one base layer BL followed by a first enhancement layer (Enhancement Layer 1, or EL1) and a second enhancement sub-layer (Enhancement Layer 2, or EL2). The first two sub-layers (BL and EL1) are used at the encoding stage for the prediction of a higher spatial level and, at the decoding stage, for the reconstruction of points of the current spatial level and of the higher spatial levels.

The second enhancement sub-layer (EL2) is used solely for the reconstruction of points of the current spatial level. This second enhancement sub-layer represents the dead sub-stream.

It will be noted that FIG. 9 illustrates a particular example of an embodiment in which each data layer comprises at least one enhancement sub-layer EL1, in addition to the additional sub-stream EL2 proposed by an embodiment of the invention. It is of course also possible that certain data layers of certain spatial levels are encoded only in the form of a base sub-stream BL, to which the embodiment of the invention adds a dead sub-stream in a single enhancement sub-layer EL.

When a dead sub-stream is added by the encoder in a data layer of a given spatial resolution level n, this needs to be reported by the insertion of a specific piece of information in the total data stream so that the dead sub-stream can be exploited when decoding.

Here below we present an example of insertion of a specific piece of information relative to the presence of a dead sub-stream in the total data stream. We may first of all recall the structure of the data stream proposed in the framework of the SVM of the MPEG-21.

In the implementation of the SVM, the stream is structured as information entities called NALs ("network adaptation layers"). A NAL is a transportation unit according to the H264 standard (ITU-T and ISO/EC JTC1, "Advanced Video Coding for Generic Audiovisual Services," ITU-T Recommendation H.264-ISO/IEC 14496-10 AVC, 2003). This is a packet comprising a header and an integer number of data bytes (also called a "payload").

The header of a NAL comprises a type byte which can be used to qualify the type of NAL. The payload data field is used to convey a stream corresponding to the encoding of a spatial level, a temporal level and a quality level (base level or FGS level) for a sub-band image or a part of an image. In the SVM syntax, a NAL may be of several types: in particular the types 20 and 21 are reserved to describe a NAL whose sub-stream is an enhancement sub-stream of an image (intra or non-intra).

The introduction of a dead sub-stream into the stream corresponding to the introduction of an additional enhancement sub-stream, as explained here above with reference to FIG. 9 (sub-layer EL2), this dead sub-stream is therefore transmitted in a NAL. Every type of NAL whose use has not yet been dictated by the syntax of the SVM can be used to designate a NAL conveying a dead sub-stream, such as for example the types 22 or 23.

In another alternative embodiment of the invention, it is also possible to envisage the transportation, in a same NAL, of the dead sub-stream of a level n layer, and the enhancement sub-stream if it exists. In other words, the sub-layers EL1 and EL2 are then grouped together in a same NAL, and an additional piece of information indicates where the breakpoint is situated in the NAL between the sub-streams EL1 and EL2.

Figure 10:
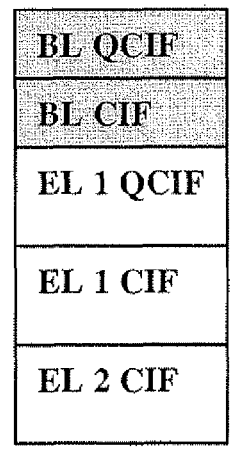
FIGS. 10 and 11 illustrate two examples of extraction from the CIF and QCIF format.

The description here below, with reference to FIGS. 10 and 11, focuses on the principle of operation of a module of adaptation of the quality of the images, also called an extractor. It may be recalled that an extractor such as this can be situated directly at output of the encoder, just before the decoder, or again at any point of the transmission network by which a customer accesses the encoded data stream. It enables the extraction, from the total stream, of certain pieces of data which are not necessary for the final customers that they serve. More specifically, the extractor of the SVM studies the characteristics of each NAL (spatial and temporal levels, FGS) and keeps or truncates the NALs used for decoding at a given bit rate and in a given format (or level of space-time resolution).

According to an embodiment of the invention, the introduction of dead sub-streams modifies the reading of the headers of NALs by the extractor as follows:

Let nivSpatialDec be the level of spatial resolution requested at decoding, nivSpatialNAL, the spatial resolution level of the current NAL, type NAL, the type of the current NAL
If ((typeNAL==22||typeNAL==23) and nivSpatialDec==nivSpatialNAL) {Extraction of the NAL}

In other words, the working of the extractor is modified so that, from the total data stream, it also extracts the NALs conveying the dead sub-streams of the spatial resolution level to be attained at decoding. FIGS. 10 and 11 present two examples of extraction, respectively for an extraction of the video sequence in the CIF and QCIF formats, when only these two successive levels of spatial resolution are considered.

For a reconstruction of the images in the CIF format, the decoder uses the base sub-streams of the two spatial levels (BL QCIF and BL CIF), the first enhancement layers of the two spatial levels (Enhancement Layer EL1 QCIF and Enhancement Layer EL1 CF) as well as the second enhancement level of the CF level (Enhancement Layer EL2 CIF). Hence, from the total stream, the extractor must extract the set of sub-layers represented in FIG. 10, in this order, in order to insert them into a modified stream. Depending on the bit rate used for the reconstruction of the point the different sub-layers may be decoded, i.e. the corresponding sub-stream may be truncated only in part (for example, partial decoding of the enhancement sub-stream, EL1 CF, and in this case the dead sub-stream EL2 CF is not used as the bit rate does not permit it).

Figure 11:
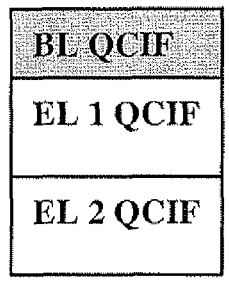

For a reconstruction in the QCIF format, the decoder uses the base sub-stream of the QCIF level (Base Layer QCIF) and the two enhancement sub-streams of the QCIF level (Enhancement Layer EL1 QCIF and Enhancement Layer EL2 QCIF), as illustrated in FIG. 11. Again, the different layers BL QCIF, EL1 QCIF and EL2 QCIF may be truncated depending on the bit rate allocated to the reconstruction of the images in the QCIF format.

Figure 18:
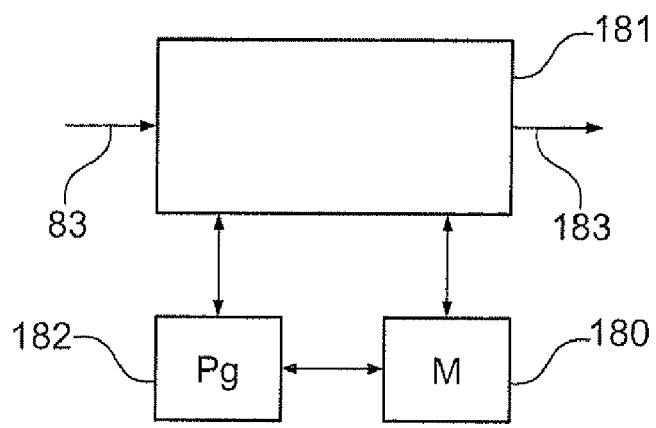

FIG. 18 presents the simplified structure of such an extractor or image quality extraction module comprising a memory M 180, a processing unit 181, equipped for example with a microprocessor and driven by the computer program Pg 182. At initialization, the computer program 182 code instructions are for example loaded into a RAM before being executed by the processor of the processing unit 181. The processing unit 181 receives at input a compressed data stream 83, organized according to a hierarchical structure of successive resolution levels n. From the data stream 83, the microprocessor μP extracts all the sub-streams that will not be used at decoding (depending on the nature of the target terminals for example or of the desired quality in reconstruction), according to the instructions of the program Pg 182. The processing unit 181 outputs a modified data stream 183, adapted to the processing capacities of the customer terminals or to the constraints of the transmission network.

In the alternative embodiment of the invention in which the dead sub-streams are conveyed by type 22 or 23 type NALs, the decoder proposed in the context of the MPEG-21 SVM model must be modified so as to decode the type 22 and 23 modules:
If (typeNAL==20||typeNAL=21||typeNAL==22||typeNAL==23){Decode NAL}

Here below, referring to FIGS. 12 to 16, a description is given of an embodiment of the invention carrying out, in addition to the insertion of dead sub-streams, an adapted selection of quality in the spatial layers. The adapted selection of quality in the data layers of successive levels n enables the definition, for each bit rate point to be attained at decoding, of an optimum extraction path, i.e. the path offering the best reconstruction of the point in the bit rate/distortion sense. This variant of the invention relies on the definition and insertion of information cells in the total stream.

The use of adapted extraction paths further improves the extraction technique of an embodiment of the invention, as follows:

a computation is made, for several bit rate points of each space-time resolution level N (i.e. for each bit rate/distortion curve), of a value representing their quality included between a minimum QNmin and a maximum QNmax. This computation can de done:
- either at the time of the encoding of each spatial resolution layer;
- or after the encoding of all the layers of the different spatial levels;

in the total stream, a piece of information is inserted enabling this measurement of quality to be retrieved at the extraction that precedes the decoding operation.
- either by inserting this piece of information in the data entities of the encoded stream themselves, i.e. in the NALs conveying the base sub-streams or the enhancement sub-streams;
- or by inserting this piece of information in an entity separate from the data entities of the encoded stream.

at the time of extraction of a bit rate point R corresponding to a quality Q of a spatial level n, the data entities corresponding to this quality are then extracted for all the spatial levels below n or equal to n in seeing to it that no dead sub-stream of a level lower than n is used.

Thus, according to this variant, an independent sub-stream is created for each image. Each of these sub-streams is scanned to determine, for each image, the truncation point that enables a given quality and/or bit rate to be obtained. The final stream therefore consists of a certain quantity of quality "levels".

Figure 12:
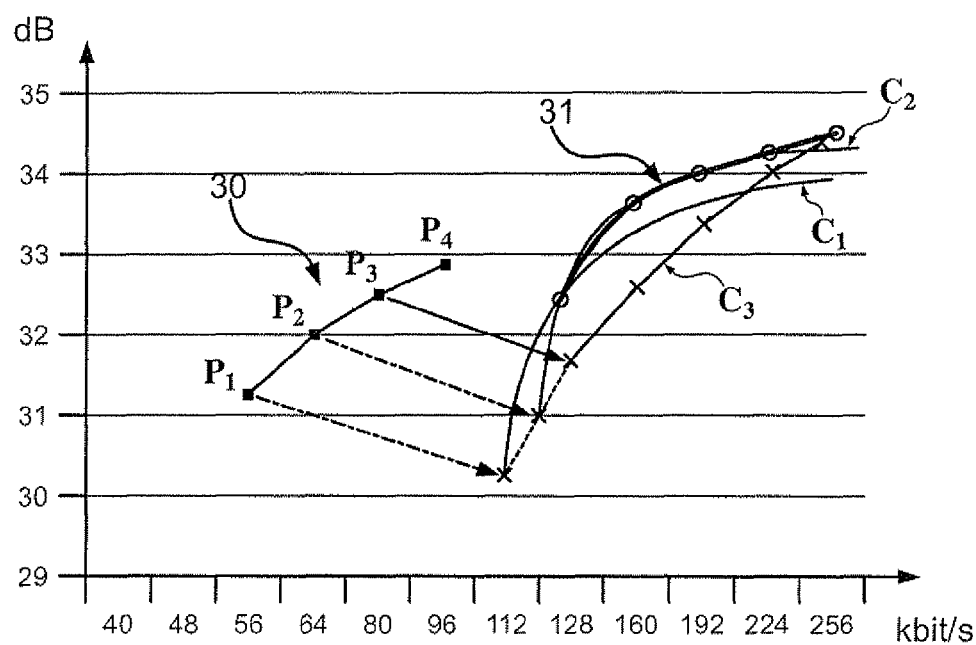
FIGS. 12 to 16 illustrate a particular embodiment of the invention in which, in addition to the dead sub-streams, the images are sub-divided into successive quality levels used during the reconstruction.

FIG. 12 more specifically presents the modification of the prediction/extraction mechanism induced by this variant of the invention based on the implementation of the optimum extraction paths. Again, the description is situated in the particular context of two successive levels of space-time resolution QCIF and CIF. The description considers the bit rate/distortion curves associated with these two levels, the x-axis representing the bit rate expressed in kbits/s and the y-axis representing the PSNR expressed in dB.

We consider four points P1, P2, P3 and P4 available on the level N−1 (QCIF) curve referenced 30. These four points P1 to P4 are considered to be possible predictors for the level N curve (CIF).

Thus, the point P1 can be used, by prediction, to obtain the curve C1, while the curves C2 and C3 are derived respectively from a prediction by the points P2 and P3. The curve referenced 31 corresponds to the curve obtained by prediction from the maximum bit rate point P4 of the QCIF level, and therefore represents the CIF level curve obtained from the prior art MPEG-21 SVC encoder.

From the different curves C1 to C3, it is possible to select the best prediction point of the QCIF curve 30 (in the bit rate/distortion sense) corresponding to each target bit rate: thus the minimum distortion at a bit rate of 128 kbits/s is attained on the curve C1, so that the 128 kbit/s bit rate point is predicted at best from the prediction point P1; similarly, the minimum distortion for the 192 kbits/s bit rate point is attained on the curve C3, so that this bit rate point is predicted at best from the prediction point P3.

In this way, we obtain "quality" curves formed by a point of the level N (CIF) curve and by its optimal predictor of the (QCIF) level N−1 curve as understood according to the algorithm (which may be different from that used at the encoder).

The optimum processing paths are determined by an additional processing step at the level of the encoder. As indicated here above, this step can be implemented during the encoding, or may be independent of the encoder because it is performed after the data encoding/compression operation.

Here below, referring to FIG. 13, a more detailed description is presented of an example of computation of the quality associated with a bit rate point implemented in the encoder or in a post-processor.

We have available a set of "images" (whether residual or not) that are sub-divided into several levels of quality (i.e. a base level and one or more enhancement or improvement levels) distributed in NALs. It is assumed that the NALs $N_i$ may be truncated at sub-points $n_i$ (which is applied chiefly to the enhancement sub-streams) generating a bit rate $R_i''$ for a distortion $D_i''$. It is thus assumed, for the sake of simplification, that the measurement of distortion is additive.

A search is made for the optimum way to sub-divide the NALs of an image into i points $n_i^\lambda$, so as to minimize the distortion, with the constraint of the maximum bit rate that can be attained for space-time resolution level considered. It is therefore sought to minimize the following quantity in the image:

$$D(\lambda) + \lambda R(\lambda) = \sum_i \left(D_i^{n_i^\lambda} + \lambda R_i^{n_i^\lambda}\right)$$

In practice, a certain number of possible truncation points are defined in each NAL (for example k points, but non-exhaustively at the end of each run of the entropic encoder).

Figure 13:
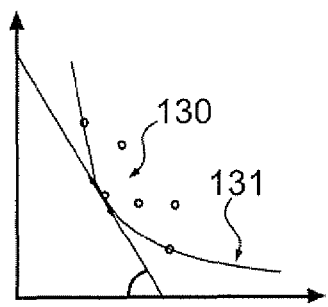

As illustrated by FIG. 13, where the x-axis presents the bit rate and the y-axis represents the distortion, we consider the cloud of points referenced 130 obtained for the entire image from a set of information entities NALs. Initially, the points of this cloud 130 belonging to the bit rate-distortion curve of the space-time resolution level considered are determined according to the technique described especially in the document by David Taubman "High Performance Scalable Image Compression with EBCOT" which may be consulted for further details. A search is therefore made for the convex envelope 131 in which these points of a given space-time resolution are contained.

For a given value of $\lambda$, i.e. for a given quality, the algorithm is the following:
Initialize $n_i^\lambda = 0$
For $j = j_1, j_2, \ldots j_k$ $$\Delta R_i^j = R_i^j - R_i^{n_i^\lambda}; \Delta D_i^j = D_i^{n_i^\lambda} - D_i^j$$

If $\Delta R_i^j / \Delta D_i^j < \lambda$ then $n_i^\lambda = j$

For each identified point of the curve then, the bit rate value $\Delta R_i^j$ and the value of the slope at this point $S_i^j = \Delta R_i^j / \Delta D_i^j$ are stored.

To enable these different quality levels to be exploited during the decoding, i.e. to enable the making of a truncation of a NAL at a particular point related to the level of quality to be attained, it is necessary to record a second piece of specific information in the total data stream which, in addition to the piece of information identifying a dead sub-stream, enables these quality levels to be identified.

To this end, two embodiments are proposed by the invention, one in which the pairs (bit rate, quality) associated with the points chosen when setting up truncation points are stored directly in the data NALs (i.e. the NALs conveying the base and enhancement sub-streams), and the other in which these pairs are recorded in specific NALs called information NALs. The quality $Q_i$ associated with a point is computed as a function of the slope $S_i^j$ as defined further above. ($Q_i = f(S_i^j)$).

Figure 14:
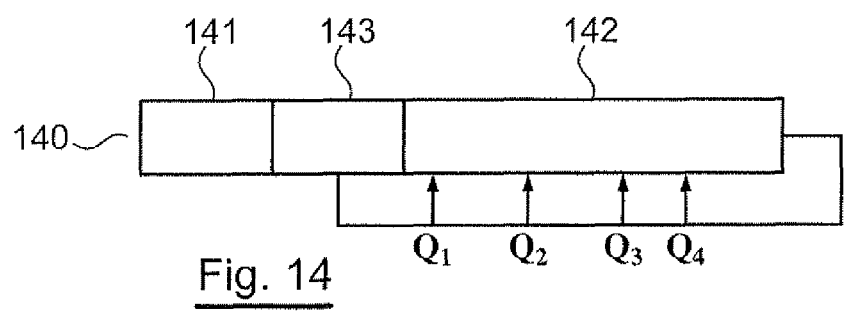

In the first embodiment illustrated by FIG. 14, a pseudo-header 143 is inserted between the header 141 and the payload data field 142 of a data NAL 140, this pseudo-header 143 containing pointers (for example in the form of offset values) on the different quality levels identified during the search for the troncature points of FIG. 13. A pointer (offset) is equivalent to a bit rate value and corresponds to a value of quality $Q_1$, $Q_2$ to $Q_4$, and is symbolized by an arrow pointing to the payload data field in FIG. 14.

Figure 15:
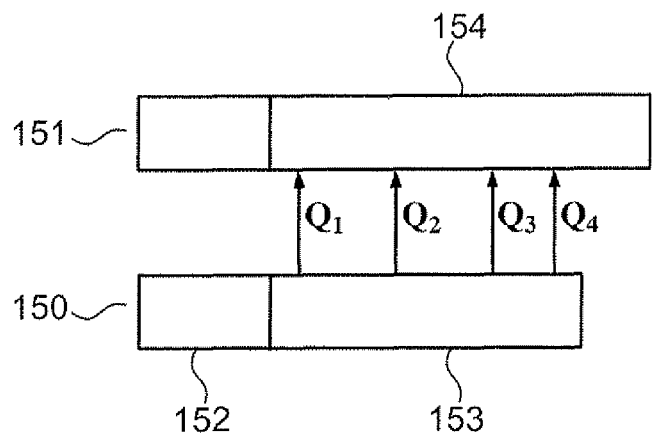

A second embodiment illustrated by FIG. 15 uses a new type of NALs, known as information NALs 150, enabling the identification of the quality levels within a data NAL 151 of the total stream. Like a data NAL 151, an information NAL 150 of this kind comprises a header 152 and a payload data field 153. For example, when it is desired to propose 10 distinct quality levels $Q_1$ to $Q_{10}$, an information NAL is built comprising 10 integers in its payload 153, each integer indicating an offset in the payload data field 154 of the data NAL 151.

When it is desired to reconstruct the video sequence at a quality level $Q_{ext}$, the necessary pieces of data are extracted from the total compressed stream. To this end, the extractor (or image quality adaptation module) makes a search in each of the NALs for the quality level closest to the level $Q_{ext}$ (i.e. the quality level lower than or equal to that of $Q_{ext}$).

Figure 16:
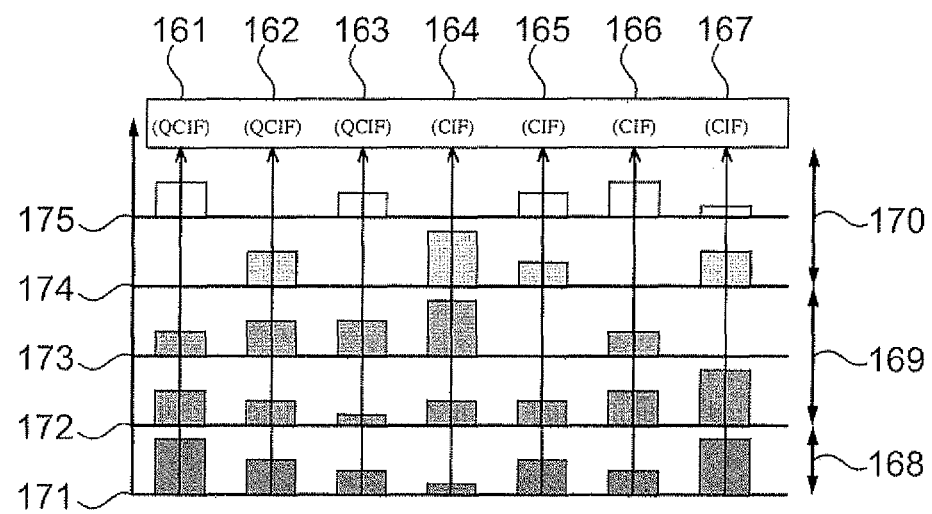

FIG. 16 illustrates an example of a structure of images in successive quality levels. Seven images referenced 161 to 167 are considered. The first three 161 to 163 are in the QCIF resolution format while the last four 164 to 167 are in the CIF format. Each of these images is encoded in the form of a base sub-stream BL 168, of a first enhancement sub-stream EL1 169 and a second enhancement sub-stream EL2 170 corresponding to a dead sub-stream. Five successive quality levels referenced 171 to 175 can be distinguished within each of these images. These quality levels correspond to points of truncation of the information entities or NALs conveying the image reconstruction data.

As can be seen in FIG. 16, the lowest quality level 171 corresponds to the base sub-stream BL 168. The decoding of the first enhancement sub-stream EL1 makes it possible to attain the intermediate quality level referenced 173 and the decoding of the dead sub-stream EL2 170 makes it possible to attain the maximum quality level 175.

Thus, for a CF decoding, if the quality required from the extractor is $Q_{ext}$=3, the three lower quality levels 171, 172 and 173 will be used entirely for each image. If, on the contrary, the quality requested from the extractor is $Q_{ext}$=4, the three lower quality levels 171, 172 and 173 will be decoded in their totality for each CIF and QCIF sub-band as also the quality level reference 174 for the CIF.

In this alternative embodiment based on quality levels, the extractor or image quality adaptation module carries out the truncation of the information entities at the optimum point relative to the level of quality desired in reconstruction (it will be noted that this truncation is adaptive by image or subband). The decoder therefore receives NALs that have been preliminarily truncated at the "best" point and all that remains for it to do is to decode in order to reconstruct the video sequence.

Figure 19:
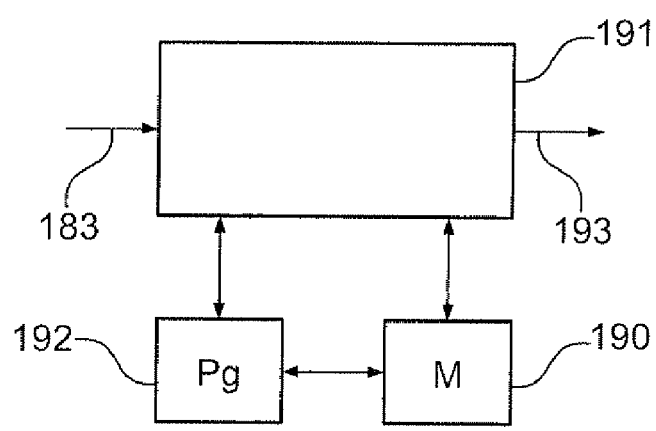

FIG. 19 shows the simplified structure of a decoder of this kind comprising a memory M 190, a processing unit 191, equipped for example with a microprocessor and driven by the computer program Pg 192. At initialization, the computer program 192 code instructions are for exampled loaded into a RAM before being executed by the processor of the processing unit 191. At input, the processing unit 191 receives a set of data packets 183, or information entities to be decoded, for example a set of NALs truncated at the optimum bit rate point as a function of the reconstruction quality to be attained. The microprocessor µP of the processing unit 191 decodes the information entities received 183, according to the instruction of the program Pg 192. The processing unit 191 outputs a reconstructed video sequence 193 adapted to the processing capacities of the customer's display terminal.

In summary, a technique is therefore provided for the scalable encoding and decoding of video images and/or sequences relying on an organization of the data stream in layers, with inter-layer prediction, that is an improvement on the technique of the SVM model proposed by the MPEG-21 working group in the document N6716 ISO/IEC JTC 1/SC 29/WG 11, entitled "Scalable Video Model 3.0", October 2004, Palma de Majorca, Spain.

In a particular example, a technique of this kind is provided that can be used, when decoding, for the reconstruction of images at a given resolution level n of higher quality than in the prior art. A technique of this kind that makes it possible, for a given level of resolution n−1, to attain a bit rate higher than the one used for the encoding by prediction of the resolution level n.

In an example, a technique of this kind can be used for the definition, for each bit rate point, of an optimum extraction path, namely the path offering the best reconstruction of the point in the bit rate/distortion sense.

In an example, a technique of this kind is simple to implement and costs little in terms of resources (bandwidth, processing capacities etc).

In an example, a technique of this kind enables efficient data compression while at the same time enabling high-quality reconstruction of the images.

In an example, a technique of this kind can be used to satisfactorily serve a plurality of users having different modalities of access to the data stream and display terminals having different processing capacities.

Although the present disclosure have been described with reference to one or more examples, workers skilled in the art will recognize that changes may be made in form and detail without departing from the spirit and scope of the disclosure and/or the appended claims.

The invention claimed is:

1. Method for encoding an image or a sequence of images, comprising:
   generating a data stream having a hierarchical structure of embedded data layers of successive levels n, where n is an integer, each of said levels n corresponding to a predetermined resolution of said images,
   encoding at least one of said layers, of level n+1, by prediction at least from said level n layer, wherein each of said data layers of level n enables reconstruction of a version of said images at said resolution level n of a predetermined maximum quality,
   encoding, for at least one of said level n data layers, at least one sub-stream, called a dead sub-stream enabling reconstruction of a version of said images at said resolution level n of a quality higher than that of said predetermined maximum quality, and wherein said dead sub-stream of said layer of level n comprises additional information associated with the resolution level n, neither used for the encoding by prediction of resolution level n+1 nor for the reconstruction of the image at resolution level n+1, but only used at decoding for image reconstruction at resolution of level n.

2. Encoding method according to claim 1, wherein said level n data layers are encoded in the form of at least one base sub-stream enabling the reconstruction of a base quality version of the images with said resolution level n and, for at least one of said level n data layers, of at least one enhancement sub-stream enabling said base quality version to be refined, to obtain at least one enhanced quality version of said images, and wherein said predetermined maximum quality is:
said base quality if said enhancement sub-stream is not encoded;
said at least one enhanced quality if at least one enhancement sub-stream is encoded.

3. Encoding method according to claim 1, further comprising a step of insertion in said data stream of at least one piece of information used to identify said a least one dead sub-stream within said data stream.

4. Encoding method according to claim 1, further comprising, for at least certain of said images, a step of insertion in said data stream of at least one piece of information on reconstruction quality associated with at least certain pieces of data of at least certain of said layers, said reconstruction quality being a function of at least one bit rate/distortion parameter.

5. An encoding device for encoding an image or a sequence of images, the device comprising:
means for generating a data stream, said data stream having a hierarchical structure of embedded data layers of successive levels n, where n is an integer, each of said levels n corresponding to a predetermined resolution of said images, each of said data layers of level n enabling reconstruction of a version of said images at said resolution level n of a predetermined maximum quality, and
an encoder, which encodes a layer of level n+1 by prediction at least from said level n layer, and which is configured to encode, for at least one of said level n data layers, at least one sub-stream, called a dead sub-stream, enabling reconstruction of a version of said images at said resolution level n of a quality higher than that of said predetermined maximum quality, wherein said dead sub-stream of said level n layer comprises additional information associated with the level n, neither used by the encoder for the encoding by prediction of level n+1 nor for the image reconstruction at resolution level n+1, but only used at decoding for image reconstruction at level n.

6. The encoding device according to claim 5, wherein the device comprises a prediction point extraction module enabling extraction, from within said level n layer, of data to be taken into account during the encoding by prediction of said level n+1 layer.

7. A method for decoding a data stream representing an image or a sequence of images,
wherein said data stream comprises a hierarchical structure of embedded data layers of successive levels n, where n is an integer, each of said level n layers corresponding to a predetermined resolution of said images, each of said data layers of level n of said stream enabling the reconstruction of a version of said images at said resolution level n of a predetermined maximum quality, at least one of said layers, of level n+1, having been encoded by prediction at least from said level n layer, and wherein said data stream comprises, for at least one of said level n data layers, at least one sub-stream, called a dead sub-stream, enabling the reconstruction of a version of said images at said resolution level n of a quality higher than that of said predetermined maximum quality;
wherein said method implements, for reconstruction of said images with said resolution level n, steps of:
receiving a modified data stream, obtained from said data stream by keeping the sub-streams that will be used in reconstruction;
decoding said data layers of a resolution level that is lower than n of said modified data stream;
at least partially decoding said data layer of the resolution level n of said modified data stream comprising said dead sub-stream of said data layer of resolution level n,
wherein said dead sub-stream of said layer of said resolution level n comprises additional information associated with the resolution level n, which is neither used for the encoding by prediction of resolution level n+1 nor for the reconstruction of the image at resolution level n+1, but only used at decoding for image reconstruction at resolution level n.

8. A device for decoding a data stream representing an image or a sequence of images, wherein said data stream comprises a hierarchical structure of embedded data layers of successive levels n, where n is an integer, each of said levels n corresponding to a predetermined resolution of said images, each of said data layers of level n of said stream enabling the reconstruction of a version of said images at said resolution level n of a predetermined maximum quality, at least one of said layers, of level n+1, having been encoded by prediction at least from said level n layer, and wherein said data stream comprises, for at least one of said level n data layers, at least one sub-stream, called a dead sub-stream, enabling the reconstruction of a version of said images at said resolution level n of a quality higher than that of said predetermined maximum quality,
wherein said device comprises, for reconstruction of said images with said resolution of level n:
an input, which receives a modified data stream, obtained from said data stream by keeping the sub-streams that will be used during reconstruction;
a first decoder, which decodes said data layers of a resolution level that is lower than n of said modified data stream; and
a second decoder, which at least partially decodes said data layer of resolution level n of said modified data stream comprising said dead sub-stream of said resolution level n, wherein said dead sub-stream of said layer of said resolution level n comprises additional information associated with the resolution level n, which is neither used for the encoding by prediction of resolution level n+1 nor for the reconstruction of the image at resolution level n+1, but only used at decoding for image reconstruction at resolution level n.

9. A computer program comprising program code instructions stored on a non-transitory computer-readable memory, which when executed in or by a microprocessor encode an image or a sequence of images according to steps comprising:
generating a data stream having a hierarchical structure of embedded data layers of successive levels n, where n is an integer, each of said levels n corresponding to a predetermined resolution of said images,
encoding at least one of said layers, of level n+1, by prediction at least from said level n layer, wherein each of said data layers of level n enables reconstruction of a version of said images at said resolution level n of a predetermined maximum quality, and
encoding, for at least one of said level n data layers, at least one sub-stream, called a dead sub-stream enabling reconstruction of a version of said images at said resolution level n of a quality higher than that of said predetermined maximum quality, and wherein said dead sub-stream of said layer of level n comprises additional information associated with the resolution level n, which is neither used for the encoding by prediction of resolution level n+1 nor for the reconstruction of the image at resolution level n+1, but only used at decoding for image reconstruction at resolution level n.

10. A computer program comprising program code instructions stored on a non-transitory computer-readable memory, which when executed in or by a microprocessor decode a data stream representing an image or a sequence of images according to steps comprising:

receiving said data stream, which comprises a hierarchical structure of embedded data layers of successive levels n, where n is an integer, each of said level n layers corresponding to a predetermined resolution of said images, each of said data layers of level n said stream enabling the reconstruction of a version of said images at said resolution level n of a predetermined maximum quality, at least one of said layers, of level n+1, having been encoded by prediction at least from said level n layer, and wherein said data stream comprises, for at least one of said level n data layers, at least one sub-stream, called a dead sub-stream, enabling the reconstruction of a version of said images at said resolution level n of a quality higher than that of said predetermined maximum quality;

implementing, for reconstruction of said images with said resolution level n, steps of:
  decoding of said data layers of a level lower than n; and
  depending on an authorized decoding bit rate, at least partial decoding of said level n layer and, as the case may be, of said dead sub-stream of said level n layer, wherein said dead sub-stream of said layer of said resolution level n comprises additional information associated with the resolution level n, which is neither used for the encoding by prediction of resolution level n+1 nor decoded for the reconstruction of the image at resolution level n+1, but only used at decoding for image reconstruction at resolution level n.

11. An adaptation module providing for a quality adaptation of an image or sequence of images, said adaptation module being fed by a source data stream representing an image or sequence of images and comprising;

an input, which receives said source data stream having a hierarchical structure of embedded data layers of successive levels n, where n is an integer, each of said levels n corresponding to a predetermined resolution of said images, each of said data layers of level n of said stream enabling the reconstruction of a version of said images at said resolution level n of a predetermined maximum quality, at least one of said layers of level n+1 having been encoded by prediction at least from said level n layer, and wherein said source data stream comprises, for at least one of said level n data layers, at least one sub-stream, called a dead sub-stream, enabling the reconstruction of a version of said images at said resolution level n of a quality higher than that of said predetermined maximum quality, and a decoder, which is coupled to the input and generates a modified data stream intended for at least one terminal for the display of said images, said modified data stream being obtained from said source data stream by extraction, from said level n dead sub-stream if said at least one display terminal does not reconstruct said images with said resolution level n, wherein said dead sub-stream of said layer of said resolution level n comprises additional information associated with the resolution level n, which is neither used for the encoding by prediction of resolution level n+1 nor for the reconstruction of the image at resolution level n+1, but only used at decoding for image reconstruction at resolution level n.

12. A non-transitory storage medium comprising at least one data stream representing an image or sequence of images, said medium having a structure for a hierarchical storage of embedded data layers of successive levels n of said data stream, where n is an integer, each of said levels n corresponding to a predetermined resolution of said images, at least one of said layers, of level n+1 having been encoded by prediction at least from said level n layer, each of said data layers of level n of said stream enabling the reconstruction of a version of said images at said resolution level n of a predetermined maximum quality, wherein said medium also comprises, for at least one of said level n data layers, at least one zone for the storage of at least one sub-stream, called a dead sub-stream, enabling the reconstruction of a version of said images at said resolution level n of a quality higher than that of said predetermined maximum quality, said storage zone of said dead sub-stream of level n wherein said dead sub-stream of said layer of said resolution level n comprises additional information associated with the resolution level n, which is neither used for the encoding by prediction of resolution level n+1 nor read from the storage zone of said dead sub-stream for the reconstruction of the image at resolution level n+1, but only used at decoding for image reconstruction at resolution level n.

* * * * *

UNITED STATES PATENT AND TRADEMARK OFFICE
CERTIFICATE OF CORRECTION

PATENT NO.       : 8,315,315 B2
APPLICATION NO.  : 11/813836
DATED            : November 20, 2012
INVENTOR(S)      : Isabelle Amonou et al.

It is certified that error appears in the above-identified patent and that said Letters Patent is hereby corrected as shown below:

In the Claims

In Column 19, Claim 3:

In line 10, delete "a" and insert --at--

Signed and Sealed this
Sixteenth Day of June, 2015

Michelle K. Lee
*Director of the United States Patent and Trademark Office*